United States Patent
Chisholm

(10) Patent No.: US 7,657,623 B2
(45) Date of Patent: Feb. 2, 2010

(54) METHOD AND APPARATUS FOR COLLECTING MANAGEMENT INFORMATION ON A COMMUNICATION NETWORK

(75) Inventor: Sharon Chisholm, Ottawa (CA)

(73) Assignee: Nortel Networks Limited, St. Laurent, Quebec (CA)

( * ) Notice: Subject to any disclaimer, the term of this patent is extended or adjusted under 35 U.S.C. 154(b) by 980 days.

(21) Appl. No.: 10/808,065

(22) Filed: Mar. 24, 2004

(65) Prior Publication Data

US 2005/0216584 A1  Sep. 29, 2005

(51) Int. Cl.
 *G06F 15/173* (2006.01)
(52) U.S. Cl. .................. 709/224; 709/223; 715/736; 719/318
(58) Field of Classification Search ............. 709/223, 709/224, 217; 719/318; 715/735–736
 See application file for complete search history.

(56) References Cited

U.S. PATENT DOCUMENTS

| | | | | |
|---|---|---|---|---|
| 5,819,028 | A * | 10/1998 | Manghirmalani et al. ... | 709/224 |
| 5,944,782 | A * | 8/1999 | Noble et al. ............. | 709/224 |
| 7,003,564 | B2 * | 2/2006 | Greuel et al. ............ | 709/224 |
| 7,120,819 | B1 * | 10/2006 | Gurer et al. ............. | 709/224 |
| 7,146,568 | B2 * | 12/2006 | Richardson ............. | 715/736 |
| 2001/0013107 | A1 * | 8/2001 | Lewis .................... | 714/47 |
| 2002/0002616 | A1 * | 1/2002 | Lim ...................... | 709/226 |
| 2002/0019867 | A1 * | 2/2002 | Pulkkinen ............... | 709/217 |
| 2003/0048292 | A1 * | 3/2003 | Branson et al. .......... | 345/736 |
| 2003/0126254 | A1 * | 7/2003 | Cruickshank et al. ...... | 709/224 |
| 2003/0198187 | A1 * | 10/2003 | Mellquist et al. ......... | 370/242 |
| 2004/0073641 | A1 * | 4/2004 | Minhazuddin et al. ..... | 709/223 |
| 2005/0065805 | A1 * | 3/2005 | Moharram ............... | 705/1 |
| 2005/0086502 | A1 * | 4/2005 | Rayes et al. ............. | 713/189 |
| 2005/0216584 | A1 * | 9/2005 | Chisholm ................ | 709/224 |

* cited by examiner

*Primary Examiner*—Ramy Mohamed Osman
(74) *Attorney, Agent, or Firm*—Anderson Gorecki & Manaras LLP

(57) ABSTRACT

A method and apparatus for collecting management information on a communication network enables universal health indicators to be defined so that management information may be presented to a network operator on a management station. The universal health indicators may be defined in a top-down manner such that the definitions of the health indicators may be used across multiple network elements without changing the health indicator definitions. The health indicators may be organized in a tree-like hierarchical structure to enable additional information to be obtained about the health of the reporting network element in a predictable and organized fashion. Network element raw measurements and computed measurements are used to provide data to the health indicators, and are selected on a network technology type or MIB type basis to enable the same health indicators to be supported by multiple network technology types.

8 Claims, 3 Drawing Sheets

METHOD AND APPARATUS FOR COLLECTING MANAGEMENT INFORMATION ON A COMMUNICATION NETWORK

BACKGROUND

1. Field

This application relates to communication networks and, more particularly, to a method and apparatus for collecting management information on a communication network.

2. Description of the Related Art

Data communication networks may include various computers, servers, nodes, routers, switches, hubs, proxies, and other devices coupled to and configured to pass data to one another. These devices will be referred to herein as "network elements," and may provide a variety of network resources on the communication network. Conventionally, data has been communicated through the data communication networks by passing protocol data units (or cells, frames, or segments) over links extending between the network devices. A particular protocol data unit may be handled by multiple network devices and cross multiple communication links as it travels between its source and its destination over the network.

Network elements operating on the network may monitor numerous aspects of their status, flows passing through the network, and operation of the network itself. Indeed, a conventional network element may be configured to monitor over a thousand different aspects of its operation. Management information of this nature is conventionally stored in a Management Information Base (MIB) although it may be stored elsewhere on the network element as well. Information from the MIB is then conveyed to a management station to enable a network operator to monitor the health of the network and network elements operating on the network.

Transmission of the thousands or more of aspects of network performance and health from the network elements to the management station has several drawbacks. First, as the number of monitored attributes on the network elements increases and as the number of network elements on the communication network increases, the amount of overhead attributable to network management increases, thus limiting scalability of the network. Second, a management station on the network is typically charged with monitoring the performance and health of a number of network elements. As the size of the network elements, and hence the amount of management information increases, and as the number of managed network elements increases, the volume of information that must be collected and processed increases, which also impacts the scalability of the network. Finally, the network elements on a network may be manufactured by numerous companies which may be configured to generate different management information. Accordingly, in addition to increasing the complexity of the management station software which is tasked with interpreting the data received from the managed elements, detailed knowledge of the underlying technology is required to extract meaningful information from the collected management information.

Attempts have been made to reduce the overhead on the network and also to reduce the complexity of the management information. For example, applications have been created to remotely monitor managed entities and cache the results of the queries and make the results available to the management application or operator. This method still requires the transmission of large amounts of information on the network and has an additional problem that the information in the cache may become stale.

Another method that has been attempted is to create specialized queries on the network elements that monitor specific key measurements for an undesirable behavior. While this may alleviate the need to transport all of the management information on the network, it requires specialized knowledge of the specific technologies and encounters scalability problems with large devices or on large networks. Additionally, attempts have been made to define technology neutral health indicators, but these are not universally available. Where the health indicators are computed by the network element, the raw data supporting the health indicator is not transferred on the network, thus reducing the amount of traffic on the network, but it is not always clear how these health indicators relate to the technology specific measurements underlying the health indicator. It can therefore be difficult to determine what information to retrieve from the network element to ascertain additional information about the state of the network element when a health indicator indicates an unhealthy condition. Additionally, where the health indicators are computed by the management station, the raw information is required to be transmitted on the network which, as indicated above, is undesirable for several reasons.

SUMMARY OF THE DISCLOSURE

As described in greater detail herein, a method and apparatus for collecting management information on a communication network enables universal health indicators to be defined so that management information may be presented to a network operator on a management station. The universal health indicators may be defined in a top-down manner such that the definitions of the health indicators may be used across multiple network elements or network technologies without changing the health indicator definitions. This enables the health indicators to be readily interpreted by the network operator. Additionally, the health indicators are organized in a tree-like hierarchical structure to enable additional information to be obtained about the health of the reporting network element in a predictable and organized fashion. Network element raw measurements and computed measurements are used to provide data to the health indicators, and are selected on a network element type or MIB type basis to enable the same health indicators to be supported by multiple network element types. Additionally, by maintaining the raw data on the network element instead of transporting it on the network, the amount of management information passed between the network elements and management station may be minimized.

BRIEF DESCRIPTION OF THE DRAWINGS

Aspects of the present invention are pointed out with particularity in the claims. The following drawings disclose one or more embodiments for purposes of illustration only and are not intended to limit the scope of the invention. In the following drawings, like references indicate similar elements. For purposes of clarity, not every element may be labeled in every figure. In the figures:

DETAILED DESCRIPTION

The following detailed description sets forth numerous specific details to provide a thorough understanding of the invention. However, those skilled in the art will appreciate that the invention may be practiced without these specific details. In other instances, well-known methods, procedures, components, protocols, algorithms, and circuits have not been described in detail so as not to obscure the invention.

According to one embodiment of the invention, high-level health indicators may be defined based on parameters of interest to a network administrator, and then one or more layers of intermediate-level and raw health indicators may be defined to be used to compute the high-level health indicators. The health indicators at the various levels may depend on computed measurements and raw measurements made by the network elements, which may vary according to the type of network technology being monitored.

In operation, the health indicators at the various levels may be computed and stored by the network element and the high-level health indicators may be communicated to the network management station. If one of the high-level health indicators indicates that the network element warrants attention by the network operator, additional information about the health indicator such as the intermediate-level health indicators or raw health indicators may be communicated to the management station to provide details associated with the high-level health indicator. Communication of this additional information may be automatic or done on demand. In this manner management information may be computed by the network element and communicated to the management station in a decipherable fashion, and supporting information may be provided to the management station when required. These and other embodiments will be discussed in greater detail below.

Figure 1:
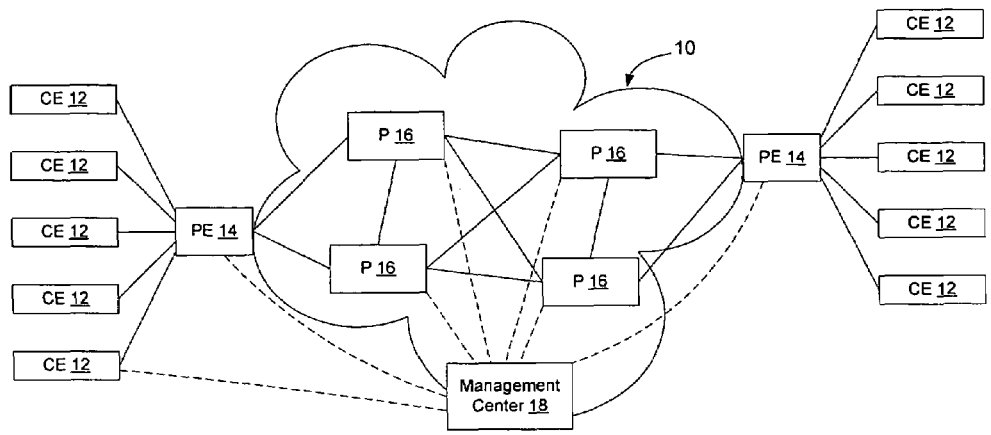
FIG. 1 is a functional block diagram of an example of a communication network including a management center according to an embodiment of the invention.

FIG. 1 illustrates a communication network 10 in which Customer Edge (CE) network elements 12 are interconnected over a provider's network containing Provider Edge (PE) network elements 14 and Provider (P) network elements 16. Conventionally, PE network elements 14 are configured to interface with the CE network elements 12 (which may be owned by the provider or owned by the customer) whereas P network elements are configured to operate wholly within the provider's network. Optionally, different protocols may be used to interface between the interfaces between CE, PE, and P network elements. For example, in an optical network, interactions between the CE network elements 12 and the PE network elements 14 may take place using a suitable optical protocol such as User to Network Interface (UNI), although numerous other protocols may be used to control interactions between the CE and PE network elements. Exchanges between the PE and P network elements may take place using Network to Network Interface (NNI) or another suitable protocol. The invention discussed herein is not limited to a particular network configuration or to particular management and control protocols in use on the network. Thus, although an embodiment of the invention will be described herein in connection with the example network set forth in FIG. 1, the invention is not limited to implementation on this type of network or on the particular example network illustrated herein.

FIG. 1 also includes a management center 18, configured to interface with the P and PE network elements, and optionally with the CE network elements. The management center is configured to implement a management station on the network to monitor operation of the network and take corrective action when warranted on the network. The management center 18 may be located on the provider's network in a convenient location, such as in a control center, or may be co-located with one or more of the network elements 14, 16 forming the network 10. Optionally, the management center may be instantiated as a distributed process on the network or multiple management centers may be included on the network for redundancy purposes, to provide a backup facility should something happen to the primary facility or should connectivity between one or more of the network elements and the management center be disrupted. The invention is not limited to including the management center at a particular location or plurality of locations on the network.

The management center may be connected to the network elements using dedicated control channels (dashed lines in FIG. 1), or may be connected to the network elements through the data network interconnecting the network elements (solid lines in FIG. 1). The invention is not limited to a particular manner of interconnecting the management center and the network elements. Numerous management protocols have been developed to enable information to be obtained from network elements and to enable corrective actions to be taken on network elements over the network. For example, several control protocols that may be used include Transaction Language 1 (TL1), a telecommunications management protocol used extensively to manage SONET and optical network devices;

Simple Network Management Protocol (SNMP), an IETF network monitoring and control protocol used extensively to monitor and adjust Management Information Base (MIB) values on network devices such as routers and switches;

Command Line Interface (CLI), an interface to an application that accepts typed input commands; and Common Object Request Broker Architecture (CORBA), a standard from the Object Management Group (OMG) for communicating between distributed objects.

although the invention is not limited to a particular implementation configured to use particular protocol(s).

The management center monitors the status of the network and collects information related to the health of the network and the network elements. According to an embodiment of the invention, high level health indicators that are of interest to the management center are defined on the network and specified on the network elements, to enable the network elements to provide meaningful health information to the management center 18. The health indicators may be defined in a manner independent of the management center, for example by an applicable standard, or may be defined by the management center for the particular network or network technologies being managed.

Figure 2:
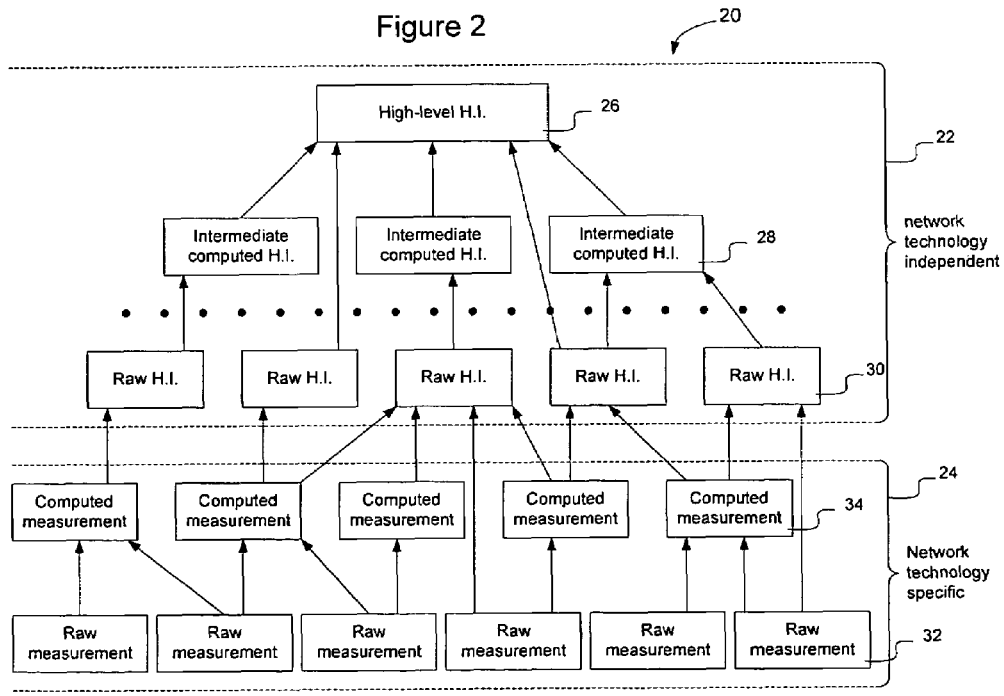
FIG. 2 is a functional block diagram of a hierarchical tree structure used to define a health indicator according to an embodiment of the invention.

FIG. 2 illustrates a hierarchical tree-like structure of a high-level health indicator definition according to an embodiment of the invention. As shown in FIG. 2, the health indicator 20 includes two parts—a network technology independent portion 22 and a network technology specific portion 24. The network technology independent portion 22 is defined by the management center or other construct to define the high level health indicator properties and supporting intermediate layer health indicators and raw health indicators that may be of interest to a network operator when diagnosing a problem on the network. The network technology specific portion 24 includes raw measurements and computed measurements, derived from one or more raw measurements, that are required to provide information to health indicators.

Specifically, as shown in FIG. 2, a health indicator according to an embodiment of the invention includes a high level health indicator 26, one or more intermediate computed health indicators 28, and raw health indicators 30. The raw health indicators, in this embodiment, are derived or computed from raw measurements 32 taken by the network element and/or computed measurements 34 that are derived from the raw measurements taken by the network element. In the embodiment illustrated in FIG. 2, only one row of intermediate computed health indicators 28 has been shown. The invention is not limited in this manner, however, as other intermediate computed health indicators may be interposed between the high level health indicator and the raw health indicators as well.

In the embodiment illustrated in FIG. 2, the network element measures values on the network, for example the number of packets arriving at an interface in a particular period of time. This raw measurement is then passed directly to a raw health indicator or may be passed to a computed measurement where it may be manipulated to create another measurement of interest. For example, assume that the network element is capable of counting the number of packets arriving on an interface. This value may be used by a computed measurement to determine an average packet arrival rate on that interface. Multiple raw measurements may be used to create a computed measurement. Similarly, multiple raw measurements or computed measurements may be passed to a raw health indicator.

The raw health indicator receives as inputs the result of one or more raw measurements and/or computed measurements, and computes a raw health indicator. One or more raw health indicators may be used as inputs to an intermediate computed health indicator and used to compute the value of that health indicator. The intermediate or raw health indicators are then used to compute the value of the high level health indicator.

Computed health indicators (raw or intermediate) may be combined to form the high level health indicator. The high level health indicator may indicate an aspect of interest to the network operator, such as the presence of congestion on the network or an alarm state on the network element that requires the operator's attention. High level health indicators may be computed from raw health indicators, computed health indicators, or a combination of other health indicators.

When a network operator receives a high level health indicator that indicates a problem on the network, the network operator may need additional information about the problem. According to an embodiment of the invention, the network operator may obtain this information by viewing the computed intermediate and raw health indicators that were used to obtain the high level health indicator. For example, assume that a high level health indicator indicates congestion on the network. The network operator may obtain the computed health indicators that were used to compute the high level health indicator to determine which of the several computed health indicators indicated the likely presence of congestion on the network. By recursing deeper into the hierarchical tree-like management structure of the health indicator the network manager may obtain additional information in an expected manner to ascertain the likely cause of the problem to enable corrective action to be taken on the network element.

According to an embodiment of the invention, the raw measurements and computed measurements are maintained by the network element and only the health indicators are passed to the management center. By maintaining the measurement information on the network element, the amount of information required to be transmitted on the network and processed by the management center may be minimized to allow larger numbers of network elements to be managed by a given management center. Optionally, the raw health indicators and intermediate computed health indicators may also be maintained on the network element until required by the management center to further reduce management traffic on the network. Additionally, by organizing the management information in a tree-like structure, the management information may be accessed in a logical manner thus simplifying the diagnostic process associated with managing network elements on a network. Particularly, since the same hierarchical structure may be used to manage many different types of network technologies, advanced knowledge of the particular network element generating the adverse health indicator is not required of the network operator so that the network operator may diagnose problems on the network more easily.

Figure 3:
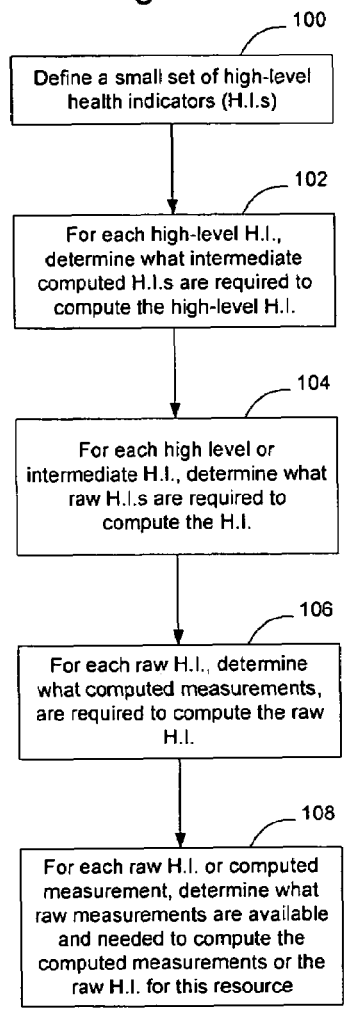
FIG. 3 is a flow diagram illustrating a process of defining health indicators for use in the software environment of FIG. 2 according to an embodiment of the invention.

FIG. 3 illustrates a process of defining high level health indicators to enable network elements to communicate management information on the network. As shown in FIG. 3, instead of starting with the raw measurements that are available on the network element and deriving from the available measurements various information, the process begins by defining a short series of high-level computed health indicators that will be of interest to the network manager while managing the network (100). Examples of several high-level computed health indicators may be network element failure, link failure, congestion, contention, and various other indicators that may signal the presence of a problem on the network, for example the inability of the network to provide sufficient resources to meet a subscriber's service level agreement. The invention is not limited to these particular examples, however, as the health indicators may be used to indicate many conditions on the network.

Once the high-level computed health indicators are defined, the process will determine, for each high level health indicator, what intermediate computed health indicators will be required to compute that high level health indicator (102), and the computations that will be required to derive the associated high level health indicator. Then, for each high level or intermediate health indicator, the process will determine what raw health indicators will be required to compute the high or intermediate level health indicator (104) as well as the computations that will be required. As discussed above, the intermediate and raw health indicators may be selected to provide a hierarchical tree structure that may be of use to a network manager attempting to trace down the source of the problem associated with a high level health indicator.

Once the health indicator(s) are defined for use on the management center, the health indicators need to be tailored to accommodate the measurement capabilities of the network technologies. Accordingly, for each network technology type that will be monitored, the health indicators are parsed to determine what computed measurements (106) and raw measurements (108) are required to support the defined health indicator. In making this determination, the process assesses what raw measurements are available, and what information is needed to be provided to the raw health indicators. This process enables the high level and other intermediate-level health indicators to be tied to available measurements, which may vary depending on the type of network technology, manufacturer, management information base, and other aspects of the network element's design.

By initially defining the high level health indicator and tree structure supporting the high level health indicator without reference to the available raw measurements, it is possible to use the same high level health indicator generically across network elements regardless of the type of network technology and other contributing factors that may affect network management appearance. By breaking the high level health indicator into a plurality of supporting raw health indicators, it is possible to more easily mate the health indicator with the raw measurements and computed measurements available on the specific network elements.

Figure 4:
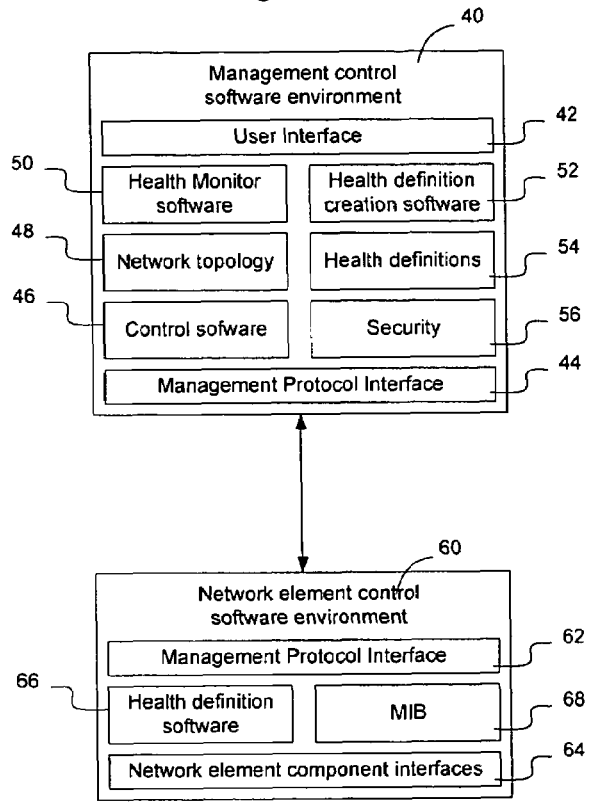
FIG. 4 is a functional block diagram of a software environment associated with management of network elements on a communication network according to an embodiment of the invention

FIG. 4 illustrates a software control package that may be implemented on the management center 18 and on one or more of the network elements to implement an embodiment of the invention. As shown in FIG. 4, the software control package includes a management center software environment 40 including a user interface 42 configured to enable the management center to interface a network manager or other client interface associated with a network management program. For example, the user interface may include a graphical user interface, command line interface, web browser interface, or other interface to enable a network manager to view information about the state or status (e.g. health indicators) of the network and network elements on the network.

The management center software environment also includes a management protocol interface 44 to enable it to communicate with network elements on the network and a control software module 46 to enable the network operator to take corrective action on the network. The management center software environment may also include additional software modules such as a network topology 48 module configured to enable the network manager to have a view of the network and a health monitor software module 50 to enable the network manager to monitor the health indicators on the network. Optionally, the management center software environment may include a health definition creation software module 52 configured to create health indicator definitions and a store of available high level health indicator definitions 54. The invention is not limited to this embodiment, however, as the health definitions (including high-level health indicator definitions) may be created external to the management center software environment. Optionally, a security module may be provided to enable network elements and the network management center to operate in a relatively secure environment, although the invention is not limited in this manner.

The software control package further includes a network element control software environment 60 including a management protocol interface 62 to enable the network element to engage in transactions with the management center, and network element component interfaces 64 to enable the network element to interface internally with the components of the network element to obtain the required raw measurement information.

A health definition software module 66 is provided to enable the network element to calculate computed measurements and health indicators according to health indicator definitions being used by the management station to monitor the network element. Optionally, a management information base 68 may be provided to store the raw measurements, and optionally computed measurements, associated with the network element.

When a raw measurement changes, the new value may be stored in the MIB. This change may affect one or more computed measurements, which in turn may affect the various computed health indicators. The timing and frequency at which the changes to raw measurements are used to update computed measurements and health indicators is a matter of policy, and hence may be implemented in a number of different ways. The invention is not limited to any particular manner of updating the health indicators based on changes to the raw measurements.

Figure 5:
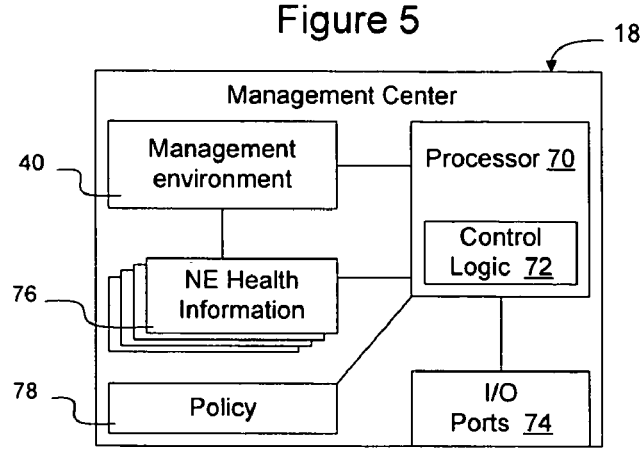
FIG. 5 is a functional block diagram of a management station according to an embodiment of the invention.

FIG. 5 illustrates an embodiment of a management center 18 according to an embodiment of the invention. As shown in FIG. 5, the management station may be configured to be implemented on a network element including a processor 70 having control logic 72 configured to implement the functions ascribed to the management station described herein. Alternatively, the management station may be instantiated on a network element providing other services on the network and may be configured to run on the processor and control logic of the host network element. One or more input/output ports 74 may be provided to interface the management station to the network to enable it to communicate with network elements on the network.

The management center may also include management control software environment 40 discussed above in connection with FIG. 4, and configured to enable management of the communication network via monitoring of high level health indicators and, when necessary, obtaining additional details about particular aspects of the network element via the intermediate and raw computed health indicators. Optionally, a database of network element health information 76 may be maintained as well, although the invention is not limited to an embodiment that includes this additional store of information.

The management center may also include a network policy module 78 responsible for obtaining and setting policy information on the network. The policy information may affect when a particular high-level health indicator will be presented to a network operator, values used in the calculation to obtain particular high-level or intermediate health indicators, and otherwise to affect the presentation of management information to the network operator. For example, a particular network operator may wish to receive a health indication when a network element's traffic level exceeds 75% of its capacity while another network operator may not wish to receive that health indicator until the traffic level exceeds 90%. This preference may be implemented via the policy module 78 on the management center.

Although several specific modules have been described herein in connection with the management center, the invention is not limited to an embodiment that implements all of these modules or only these modules, as the management center may be implemented in myriad other ways without departing from the scope of the invention.

Figure 6:
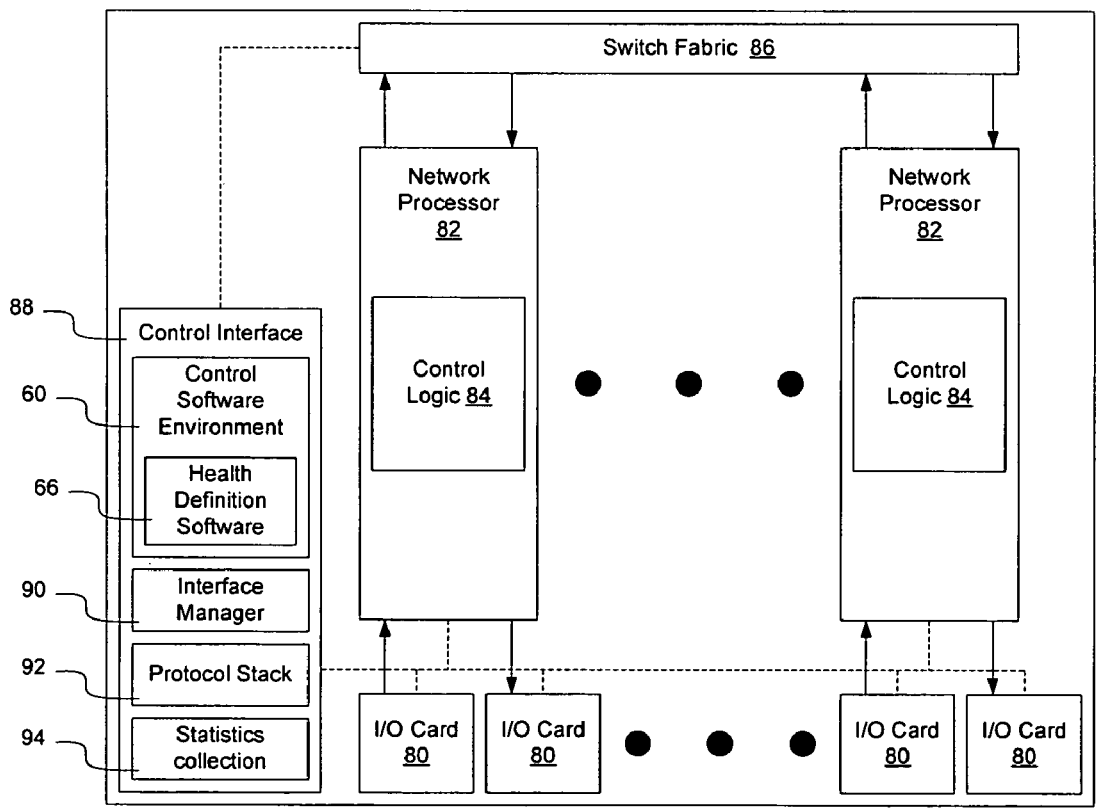
FIG. 6 is a functional block diagram of a network element according to an embodiment of the invention.

FIG. 6 illustrates a network element configured to implement an embodiment of the invention. As shown in FIG. 6, the network element includes a plurality of input/output (I/O) cards 80 configured to be connected to one or more types of physical media. Optionally, the I/O cards may also include processing capabilities to enable them to perform preliminary processing on packets received over the physical media. Packets received are passed to a network processor 82 having control logic 84 which performs necessary processing operations on the packets and passes them to a switch fabric 86. The switch fabric enables the packets to be passed to another network processor which, upon completion of its processing tasks, passes the packets to one of the I/O cards to be output on a physical media. The particular internal structure of the network element is not intended to limit the scope of the invention as numerous network element architectures may be used.

The network processors, I/O cards, switch fabric, and numerous other modules on the network element may be configured to measure values and pass the measured values to a control interface 86 on the network element. The control interface 86 may be implemented on one or more of the network processors 82 or may be instantiated in a separate processing environment, such as in a dedicated processor on the network element. The control interface 86 includes the network element control software environment 60 described above in connection with FIG. 4, which includes, for example, the health definition software 66 configured to enable the network element to calculate computed measurements and health indicators according to health indicator definitions being used by the management station to monitor the network element. The control interface 86 may also include other software modules, such as an interface manager 90, protocol stack 92, and statistics collection module 94, configured to support the modules in the control software environment. The invention is not limited in this manner, however, as other groups of modules may be provided to compliment the functionality described above with respect to the network element control software environment.

The control logic 72, 84 may be implemented as a set of program instructions that are stored in a computer readable memory within or interfaced to the network element and executed on a microprocessor, such as processor 70,82. However, in this embodiment as with the previous embodiments, it will be apparent to a skilled artisan that all logic described herein can be embodied using discrete components, integrated circuitry such as an Application Specific Integrated Circuit (ASIC), programmable logic used in conjunction with a programmable logic device such as a Field Programmable Gate Array (FPGA) or microprocessor, or any other device including any combination thereof. Programmable logic can be fixed temporarily or permanently in a tangible medium such as a read-only memory chip, a computer memory, a disk, or other storage medium. Programmable logic can also be fixed in a computer data signal embodied in a carrier wave, allowing the programmable logic to be transmitted over an interface such a computer bus or communication network. All such embodiments are intended to fall within the scope of the present invention.

It should be understood that various changes and modifications of the embodiments shown the drawings and described herein may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. A method for collecting management information on a communication network, the method comprising the steps of:
obtaining, by a computer-implemented management station on the communication network, a network technology independent high-level health indicator from a managed network element, the network technology independent high-level health indicator being computed from at least one of a technology independent intermediate-level health indicator and a technology independent raw health indicator, the technology independent intermediate-level health indicator and technology independent raw health indicator being computed values derived from technology dependent raw measurements associated with performance of the network taken by the managed network element, and technology dependent computed measurements computed from the technology dependent raw measurements taken by the managed network element; and if details of the technology independent high-level health indicator are required, obtaining by the computer-implemented management station, the technology independent intermediate-level health indicator or the technology independent raw health indicator that was used to compute the technology independent high-level health indicator.

2. The method of claim 1, wherein the technology independent high-level health indicator provides an indication of the health of the managed network element, and wherein the at least one of the technology independent intermediate-level health indicator and technology independent raw health indicator provide information about the health of an aspect of the managed network element.

3. The method of claim 1, wherein a value of the technology independent high-level health indicator is determined from a plurality of technology independent raw health indicators.

4. The method of claim 3, wherein the value of the technology independent high-level health indicator is further determined from values of a plurality of intermediate-level technology independent health indicators.

5. The method of claim 3, wherein the technology independent raw health indicators are defined independent of available measurements on the managed network elements, but are computed from technology dependent raw measurements on the managed network elements.

6. The method of claim 1, wherein at least one of the technology independent intermediate-level and technology independent raw health indicators are maintained by the managed network element and provided on demand to the computer-implemented management station on the communication network.

7. A method of utilizing technology independent health indicators to collect health information from network elements of diverse technologies, the method comprising the steps of:
determining, by a management system, a plurality of technology independent high-level health indicators;
determining, by the management system, a set of technology independent raw health indicators required to compute each of the high-level health indicators; and
for each technology, determining by the management system, a set of at least one of technology dependent computed measurements and technology dependent raw measurements required to compute the set of technology independent raw health indicators; and
instructing, by the management system, network elements utilizing each technology to make the technology dependent raw measurements and compute the technology dependent computed measurements to enable the technology independent raw heath indicators and the technology independent high-level health indicators to be computed by the network element or management system.

8. The method of claim 7, further comprising the step of determining a set of intermediate-level health indicators required to compute the high-level health indicators from the raw health indicators and computed measurements, and instructing, by the management system, the network elements utilizing each technology, to compute the intermediate-level health indicators from the raw health indicators and computed measurements.

* * * * *